United States Patent
Kuenzi

(10) Patent No.: US 9,916,742 B2
(45) Date of Patent: Mar. 13, 2018

(54) AUTOMATIC NOTIFICATION OF A CONCLUSION OF REAL PROPERTY SHOWING BASED ON USER DEVICE DETECTION

(71) Applicant: Carrier Corporation, Farmington, CT (US)

(72) Inventor: Adam Kuenzi, Silverton, OR (US)

(73) Assignee: CARRIER CORPORATION, Farmington, CT (US)

( * ) Notice: Subject to any disclaimer, the term of this patent is extended or adjusted under 35 U.S.C. 154(b) by 0 days.

(21) Appl. No.: 15/068,934

(22) Filed: Mar. 14, 2016

(65) Prior Publication Data

US 2016/0275762 A1 Sep. 22, 2016

Related U.S. Application Data

(60) Provisional application No. 62/134,358, filed on Mar. 17, 2015.

(51) Int. Cl.
*G08B 13/00* (2006.01)
*G08B 13/02* (2006.01)
(Continued)

(52) U.S. Cl.
CPC ............. *G08B 13/02* (2013.01); *G06Q 10/06* (2013.01); *G06Q 50/16* (2013.01)

(58) Field of Classification Search
CPC .... G08B 13/02; G08B 13/00; G08B 13/2491; G08B 13/122; G08B 21/22; G06Q 50/16; G06Q 10/06; G05B 15/00; G06F 21/35; G06F 2221/2111; G06F 2221/2137; G07C 9/00896; G07C 9/00309; G07C 9/00817;
(Continued)

(56) References Cited

U.S. PATENT DOCUMENTS 7,848,765 B2   12/2010 Phillips et al.
8,229,458 B2    7/2012 Busch
(Continued)

FOREIGN PATENT DOCUMENTS

WO   2009064689 A1   5/2009

OTHER PUBLICATIONS

EPSR for EP Application No. 16160868.2, dated Jul. 15, 2016, 8 pages.
(Continued)

*Primary Examiner* — Anh V La
(74) *Attorney, Agent, or Firm* — Cantor Colburn LLP

(57) ABSTRACT

A notification system, method, and/or computer program product that provides an automatic real-time notification to an owner of a property is provided. Further the notification system, method, and/or computer program determines a location with respect to an electronic lockbox associated with the property and generates a geo-fence environment with respect to the property based on the location. Then, the notification system, method, and/or computer program monitors movements of a user device with respect to the geo-fence environment to determine whether a breach of the geo-fence environment has occurred and outputs the automatic real-time notification to the property owner in response to a determination that the breach of the geo-fence environment has occurred.

14 Claims, 4 Drawing Sheets

(51) Int. Cl.
*G06Q 10/06* (2012.01)
*G06Q 50/16* (2012.01)

(58) Field of Classification Search
CPC ............ G07C 9/00904; G07C 9/00571; G07C
2009/00841; H04L 63/0823; H04W 12/06
USPC .................. 340/541, 540, 542, 545.1, 545.6
See application file for complete search history.

(56) References Cited

U.S. PATENT DOCUMENTS

| | | | |
|---|---|---|---|
| 8,229,473 B1 | 7/2012 | De La Rue | |
| 8,335,488 B2 | 12/2012 | Despain et al. | |
| 8,626,187 B2 | 1/2014 | Grosman et al. | |
| 8,680,985 B2 | 3/2014 | Brady, Jr. et al. | |
| 8,755,824 B1 | 6/2014 | Wang et al. | |
| 8,831,642 B2 | 9/2014 | Moldavsky et al. | |
| 2008/0143604 A1* | 6/2008 | Mock .................... | G01S 5/0205 342/450 |
| 2010/0148947 A1* | 6/2010 | Morgan .................. | B60R 25/04 340/426.22 |
| 2011/0309929 A1 | 12/2011 | Myers | |
| 2013/0045753 A1 | 2/2013 | Obermeyer et al. | |
| 2013/0332007 A1 | 12/2013 | Louboutin | |
| 2014/0009284 A1 | 1/2014 | Slavin et al. | |
| 2014/0026094 A1 | 1/2014 | Zimmerman et al. | |
| 2014/0155094 A1 | 6/2014 | Zises | |
| 2014/0167961 A1* | 6/2014 | Finlow-Bates ....... | H04W 4/021 340/541 |
| 2014/0171013 A1* | 6/2014 | Varoglu .................. | H04W 4/22 455/404.2 |
| 2014/0304178 A1 | 10/2014 | Bengson et al. | |
| 2014/0364103 A1 | 12/2014 | Marti et al. | |
| 2016/0035042 A1* | 2/2016 | Bomze .................. | G06Q 40/12 705/30 |

OTHER PUBLICATIONS

Meghan Kelly, "Apple's Find My Friends App Update Gives Frineds More Ways to Keep Tabs on You", internet, Mar. 29, 2013, XP002759421, Retrieved from the Internet: URL: http://venturebeat.com/2013/03/29/apple-findmyfriends-update/.
Office Action for EP Application No. 16160868.2, dated Feb. 10, 2017, 6 pages.

* cited by examiner

AUTOMATIC NOTIFICATION OF A CONCLUSION OF REAL PROPERTY SHOWING BASED ON USER DEVICE DETECTION

BACKGROUND

The disclosure relates generally to automatic notifications of a conclusion of a real property showing based on user device detection.

A homeowner often has to leave their home when a real estate agent is showing that home to a potential buyer. Often the real estate agent forgets to communicate to the homeowner that the showing is complete or does not have a means to contact the homeowner.

In addition, while present technology for enabling the showing can require that the real estate agent pushes a button on the box, real estate agents often forget to push the button, and therefore or requiring an on premise dialer or cellular connection which may not exist at the property.

SUMMARY

According to one embodiment of the present invention, a method by a notification system for providing an automatic real-time notification to an owner of a property comprises determining a location with respect to an electronic lockbox associated with the property; generating a geo-fence environment with respect to the property based on the location; monitoring movements of a user device with respect to the geo-fence environment to determine whether a breach of the geo-fence environment has occurred; and outputting the automatic real-time notification to the property owner in response to a determination that the breach of the geo-fence environment has occurred.

According to another embodiment or the method embodiment above, the generating of the geo-fence environment based on the location may further comprise generating the geo-fence environment based on data parameters.

According to another embodiment or any of the method embodiments above, the data parameters may be read from at least one of the electronic lockbox, a database coupled to the notification system, and a web-based service in communication with the notification system.

According to another embodiment or any of the method embodiments above, the geo-fence environment may be a virtual redial geo-fence with the electronic lock-bock as a center.

According to another embodiment or any of the method embodiments above, the determination that the breach of the geo-fence environment has occurred may be a determination that a user of the user device has concluded a showing and left the property.

According to another embodiment or any of the method embodiments above, the automatic real-time notification may be a message to the owner that a user of the user device has concluded a showing and left the property.

According to another embodiment or any of the method embodiments above, the message may include a duration of the showing.

According to another embodiment or any of the method embodiments above, the message may include a real time status of the showing.

According to another embodiment or any of the method embodiments above, the electronic lockbox may be a real estate lockbox.

According to one embodiment of the present invention, a notification system for providing an automatic real-time notification to an owner of a property is provided. The notification system comprises a processor and a memory. The processor configured to perform a determining a location with respect to an electronic lockbox associated with the property; a generating a geo-fence environment with respect to the property based on the location; a monitoring movements of a user device with respect to the geo-fence environment to determine whether a breach of the geo-fence environment has occurred; and an outputting the automatic real-time notification to the property owner in response to a determination that the breach of the geo-fence environment has occurred.

According to another embodiment or any of the notification system embodiments above, the generating of the geo-fence environment based on the location may further comprise generating the geo-fence environment based on data parameters.

According to another embodiment or any of the notification system embodiments above, the data parameters may be read from at least one of the electronic lockbox, a database coupled to the notification system, and a web-based service in communication with the notification system.

According to another embodiment or any of the notification system embodiments above, the geo-fence environment may be a virtual redial geo-fence with the electronic lockbock as a center.

According to another embodiment or any of the notification system embodiments above, the determination that the breach of the geo-fence environment has occurred may be a determination that a user of the user device has concluded a showing and left the property.

According to another embodiment or any of the notification system embodiments above, the automatic real-time notification may be a message to the owner that a user of the user device has concluded a showing and left the property.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Embodiments relate to a notification system, which is based on actions and/or movements of a user device with respect to a geographical fence ("geo-fence") environment related to real property, and implements operations that assist property owners and professionals who have an interest in the real property.

Figure 1:
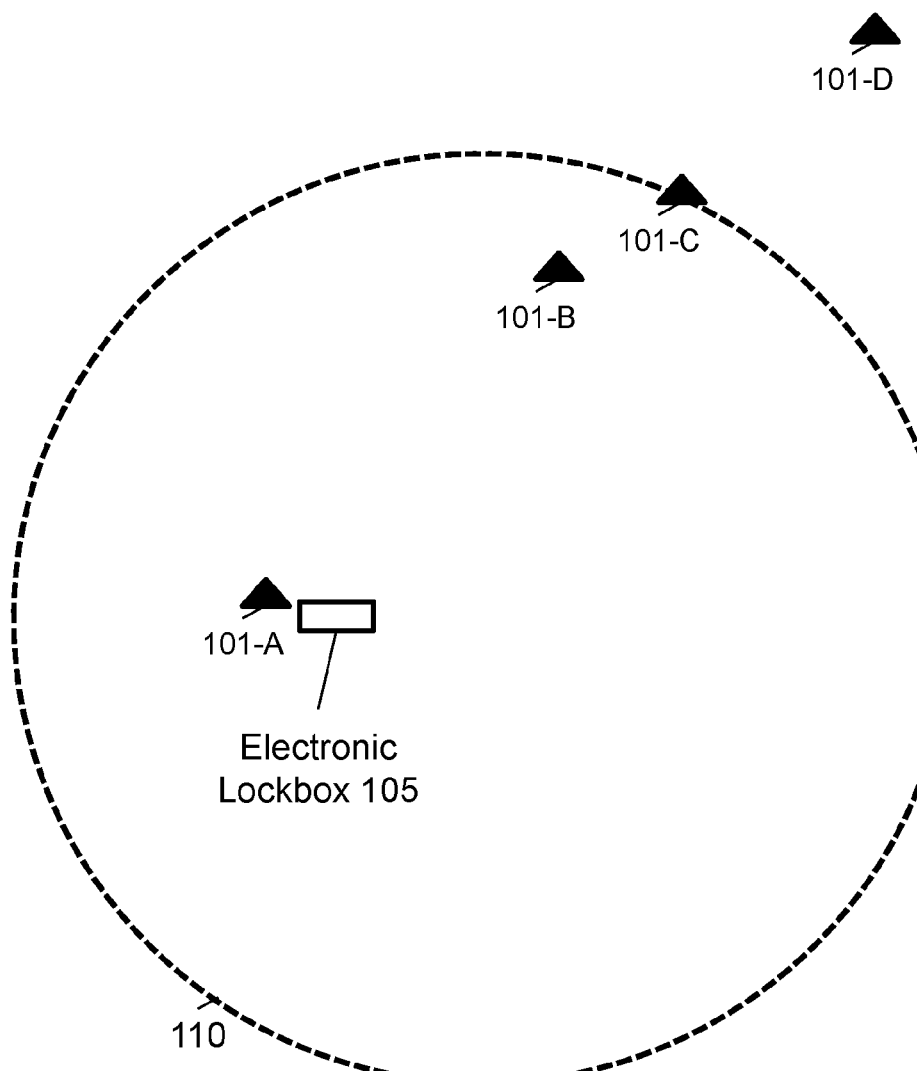
FIG. 1 illustrates an example of a schematic of a notification system according to one embodiment.

In general, embodiments of the present invention disclosed herein may include a notification system, method, and/or computer program product (herein "notification system") that utilizes an electronic lockbox to generate automatic notification. For example, at a time of access by a real estate agent, who uses their agent specific key device to open the electronic lockbox, a current location reading is taken. From this current location, a temporary and/or dynamic virtual geo-fence environment is created and monitored. When the monitoring detects that the geo-fence environment has been or is near breached (e.g., the real estate agent leaves the property), the automatic real-time notification is generated and provided to the property owner, property. Examples of a property owner may include a homeowner, a property management firm, a banker, a trust manager, a security management firm, or a delegate or agent of any of the above, or any interested party that has a reason to know about the activity at a property Referring now to FIG. 1, an example schematic of a notification system 100 is shown. The notification system 100 is only one example of a notification system and is not intended to suggest any limitation as to the scope of use or operability of embodiments of the invention described herein (indeed additional or alternative components and/or implementations may be used). The notification system 100 includes a user device 101, which is shown at multiple different positions within the notification system 100 as indicated by the capital letters A-D, an electronic lockbox 105, and a geo-fence environment represented by a geo-fence 110.

The notification system 100 may also include a controller and/or computing device that communicates with the user device 101 and/or the electronic lockbox 105. The controller may generate and monitor (or communicate with other systems and sub-systems through any network communication technologies that can generate and monitor) the geo-fence environment, such that the automatic notifications are generated and provided to the property owner, listing agent, etc. Examples of other systems and subsystems may include security systems, home automation systems, car service systems, travel indication systems, etc. Examples of automatic real-time notifications and/or signals may include generating emails, generating text messages, providing a report to the user, enabling or disabling a security alarm, enabling or disabling lights in a home, enabling or disabling a home appliance, providing a real time status of the showing, providing a duration of the showing, etc.

The user device 101 (e.g., agent specific key device) may be an identification card or electronic device having short and/or long range communication and location services (e.g., mobile phone with a location technology enabled). The user device 101 may also generate and monitor (or communicate with other systems and sub-systems through any network communication technologies that can generate and monitor) the geo-fence environment, such that the automatic notifications are generated and provided to the property owner, listing agent, etc. The user device 101 may include a notification application stored on a memory of the user device that provides computer readable instructions to generate and monitor a geo-fence 110 and acquire data parameters therefor.

A user (e.g., real estate agent) may be individually identified based on one or more identifiers stored in the user device 101. The user device 101 can provide information, such as current location, appointment time, appointment credentials, potential buyer information, visit number, and/or other preferences and data, which may also be received and utilized by the notification system 100. In this way, this information is utilized by the notification system 100 to implement operations that assist property owners and professionals who have an interest in the real property. Note the user device 101 may be representative of a plurality of user devices communicating with the notification system 100, the electronic lockbox 105, and/or the geo-fence 110.

The electronic lockbox 105 is any device that holds keys to a property to allow communal access for all real estate agents, while continuing to keep them secure (e.g., a padlock-shaped box that hangs around a doorknob of a house that is on the market). The electronic lockbox 105 may include computer hardware to generate and monitor (or communicate with other systems and sub-systems through any network communication technologies that can generate and monitor) the geo-fence environment, such that the automatic notifications are generated and provided to the property owner, listing agent, etc. The electronic lockbox 105 may alternately be a type of electronic lock that can be actuated to directly access the property without requiring a separate physical or traditional key to be used in a mechanical lock. The electronic lockbox 105 also may be in the form of a device or system associated with a real property (i.e., a real estate lockbox, a vending machine, heating ventilating air-conditioning equipment, a cellular communications tower and equipment structure, as non-limiting examples).

The geo-fence environment is a proximity system, virtual perimeter, and/or geo-fence threshold. The geo-fence environment can be temporarily or dynamically generated around a geographic location and/or be a predefined set of boundaries, as in a radius around the electronic lockbox 105 (e.g., geo-fence 110) or as in property and municipal boundaries. The geo-fence may be a set of latitude and longitude coordinates that in combination describe a boundary around a real property. The geo-fence may be contiguous or it may cover only the exit points from a property. The geo-fence may also be defined by structural metadata (e.g., data regarding design and specification of the geo-fence) and/or descriptive metadata (e.g., data particular to individual property).

Note that the geo-fence 110 is only one example of a geo-fence environment and is not intended to suggest any limitation as to the scope of use or operability of embodiments of the invention described herein (indeed additional or alternative components and/or implementations may be used). Geo-fences can be generated and monitored by any detection, communication, and/or location technology, such as global positioning systems ("GPS"), radio frequency identification ("RFID"), near field communication ("NFC"), short wave radio, proximity systems, Bluetooth Low Energy (BLE) beacons, etc.

Further, the geo-fence environment is utilized by the notification system 100 or components thereof to detect actions and/or movements of the user device 101. For example, at some distance from the property or the electronic lockbox 105 defined by the geo-fence environment (e.g., 200 yards), the notification system 100 can initiate an automatic real-time notification to an owner of the property, without the need for the owner of the user device 101 to interact with the notification system 101. Further, the notification system 100 can confirm whether the user's travel time X necessitates a delayed automatic real-time notification (e.g., user device 101 at position B), or, if the user's travel time necessitates an immediate automatic real-time notifications (e.g., since the user device 101 has made it to position C or has breached the geo-fence 110 at position D). Further, the notification can indicate the current location of the user as determined by the user device 101, or it may simply indicate that the user has left the property.

Figure 2:
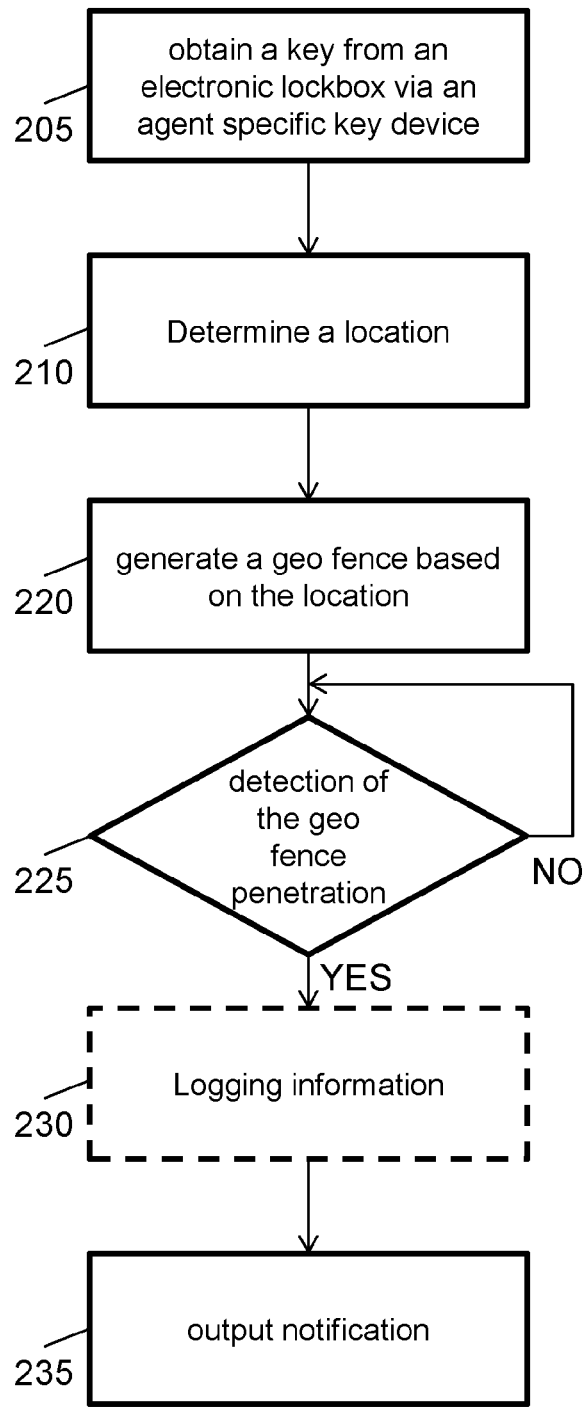
FIG. 2 illustrates a process flow by a notification system according to one embodiment.

An example of a set of operations by the notification system 100 will be described with reference to FIG. 2. FIG. 2 illustrates a process flow 200, which may be referred to as a geo-fence and location-aware process. Process flow 200 begins at start block 205 where the user device 101 (e.g., agent specific device) is utilized to obtain a key to a property from an electronic lockbox 105.

In one embodiment, an agent engages the electronic lockbox 105 with their user device 101, such as a mobile phone, to obtain the key. For example, the user device 101 is coupled with electronic lockbox 105 and once the user device 101 is validated, the electronic lockbox 105 opens and the agent receives the key to the property. Due to this coupling, the user device 101 may launch and initialize a notification application localized on the user device 101. This initialization facilitates connecting the user to the notification system 100 ahead of time so that interaction with the geo-fence 110 is immediate and any automatic real-time notifications do not wait on other communication technology connections. Note that the notification application may be optionally launched and initialized. Further, the coupling between the user device 101 and the electronic lockbox 105 may be a direct physical connection such as USB, or it may be over any short-range wireless connection, such as Bluetooth, NFC, Infrared, Wi-Fi Direct, or the like. Furthermore, the coupling may include a coupling between the user device 101, the electronic lockbox 105, and/or a contact or contactless smart card interface to establish the direct physical connection and/or the short-range wireless connection.

In another embodiment, for example, to obtain the key an agent engages the electronic lockbox 105 by sliding their user device 101, such as an ID card, into a slot on the electronic lockbox 105 and entering a personal identification code on the electronic lockbox 105. Once the key code is validated, the electronic lockbox 105 opens and the agent receives the key to the property.

Next at block 210, a location is determined. That is, when the key is successfully obtained, the user device 101, the electronic lockbox 105, and/or a controller of the notification system 100 can take a location reading via a location technology. For example, if the user device 101 is a mobile phone, then the user device 101 may determine a location via GPS, cellular triangulation, identification of the electronic lockbox 105, etc.

With the location determined, the process 200 proceeds to block 220 where the geo-fence 110 is generated based on the location. The notification system 100 can determine a temporary or dynamic geo-fence 110 based on a resolution of the location technology. For example, with GPS, a very accurate geo-fence environment can be established as a virtual parameter that tracks streets around the property. Further, when utilizing cellular triangulation, a less-accurate radial geo-fence 110 can be created. Note that multiple location technologies may be used in conjunction to create a tiered geo-fence environment to maximize available resources of the notification system 100 (e.g., a geo-fence environment may first utilize a cellular triangulation to detect a near breach, which in turn subsequently activates a GPS geo-fence for a more specific penetration determination).

Figure 3:
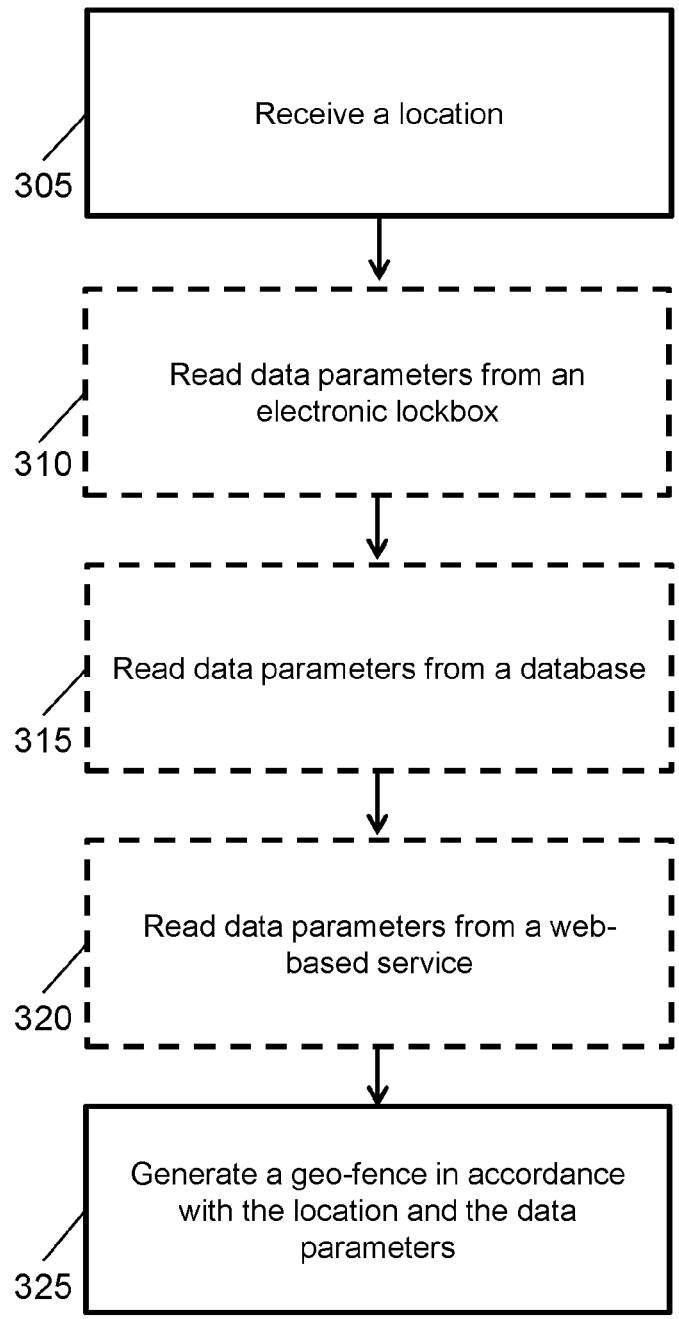
FIG. 3 illustrates a another process flow by a notification system according to one embodiment.

In one embodiment, the generating of the geo-fence 110 can be performed according to process flow 300, of FIG. 3. Process flow 300 begins at block 305 where the notification system 100 receives a location (as described above with respect to block 210 of FIG. 2). With the location acquired, the notification system 100 may procure further data utilizing that location in accordance with any combination of the blocks 310, 315, 320. Note that blocks 310, 315, 320 are depicted as dashed-boxes to illustrate their optional, interchangeable, and combinational nature.

Thus, to procure further data based on the location, the notification may read data parameters from a memory of the electronic lockbox 105 (block 310), read data parameters from a database coupled to the notification system 100 (block 315), and/or read data parameters from a web-based service in communication with the notification system 100 (block 320). The data parameters, read from any of these sources, describes a geo-fence environment that is peculiar to the property and may describe parameters of the geo-fence, such as diameter and amount of time to leave the geo-fence active. Data parameters (or data in general) may further include notification preferences, appointment schedules, appointment credentials, seller or owner information (e.g., phone number to call for end of showing, email address, etc.), buyer information, contact information, preferred location technologies, etc. Note that the electronic lockbox 105, like the database and web-based service, can be prior programmed by a listing agent or the like.

Next, at block 325, the notification system 100 generates the geo-fence 110 in accordance with the current location and data parameters. In the above mobile phone embodiment, the user device 101 itself may generate the geo-fence 110 based on the reading of the data parameters from the electronic lockbox 105, database, and/or web-based service.

In another ID card embodiment, when the agent initially obtains a key, or later returns the key into the lockbox 105 and confirm this return by sliding their ID card into the slot on the electronic lockbox 105, the electronic lockbox 105 or the controller of the notification system may acquire location data (by push or pull methods) from the agents cell phone that was not coupled to the electronic lockbox 105. This may start a notification application on the cell phone that communicates with the notification system 100 to send an automatic notification as in other described embodiments.

In another embodiment, if no data parameters are available, default settings may be employed to generate the geo-fence 110. These default settings may include a predefined radius threshold, such as 100 yards, that is used to generate a circular geo-fence around the electronic lockbox 105.

With the geo-fence environment generated, the notification system 100 is ready to process operations in response to device actions and/or movements with respect to geo-fence environment.

Returning to FIG. 2, the process flow 200 proceeds to block 225, where the geo-fence 110 is monitored so that any detection of the geo-fence 110 being breached or near breached will trigger further actions by the notification system 100. For example, the notification system 100 goes into a monitoring mode. During the monitoring mode if no device actions and/or movements with respect to geo-fence environment are detected, then the notification system continues to monitor the geo-fence environment (as indicated by the 'NO' loop of FIG. 2). However, if device actions and/or movements with respect to geo-fence environment are detected, then the notification system determines that a showing of the property has officially ended. In some embodiments, the user device 101 may implement the monitoring mode. Additionally, a "showing" may refer to when a real estate agent shows the property to a prospective buyer, but is not limited to this and may also refer to a service call by, for example, a pest and dry rot inspector.

The device actions and/or movements may include a user device 101 approaching (e.g., the user device 101 moves to position B), meeting (e.g., the user device 101 moves from position B to position C), or passing (e.g., the user device 101 moves from position C and crosses the geo-fence 101 to position D), a perimeter established by the geo-fence 110. Note that the notification system 100 may utilize times to count for a predetermined amount of time, with respect to or regardless of user device interaction with the geo-fence environment, and issue automatic real-time notifications that can be sent to the property owner. This may be useful when the user device 101 has breached the geo-fence 110 but is unable to send an automatic real-time notification because the user device 101 may be out of cellular coverage, or not able to communicate with other networks. The notification system 100 may automatically send a notification on a timeout in this case, or optionally wait until the user device 101 communicates once it returns into coverage.

The process flow 200 next may optionally, as indicated by the dashed-line, proceed to block 230 where the notification system 100 logs information with respect to the showing. For example, the notification system 100 utilizes the obtaining of the key from block 205 and the detection of a breach of the geo-fence 110 from block 225 to determine a length of time of the showing, without the need for any user to interact with the notification system 100. This logged information can then be utilized by the notification system 100 or feed into service systems coupled to the notification system 100 for record keeping, billing information, etc.

The process flow 200 then proceeds to block 230, where the automatic real-time notification is outputted to the owner of the property. The automatic real-time notification may include an indication that the property is now vacant and the owner may return home and/or information with respect to the logged parameters. The automatic real-time notification may be outputted by the user device 101 or by the controller of the notification system 100 to another user device of the home owner. For example, if a GPS of the user device 101 that is monitoring the geo-fence 101 detects that the user device 101 has crossed the geo-fence 110 by moving from position B to position D, the user device 101 may automatically send a text message to a phone number associated with the electronic lockbox 105. Further, the notification system may also send an automatic real-time notification to a subsequent user device 101 of an agent who is listed for showing the next property. This automatic real-time notification may indicate that a current user device 101 has left the property and the property is vacant, or that the current user device 101 is running late and therefore the property is not vacant. Further, the notification system is not limited to one notification message. The message may be sent to any number of recipients. Additionally, a recipient may optionally request from the notification system 100 an update on the status of the showing and stop or enable further notifications depending upon the status.

Figure 4:
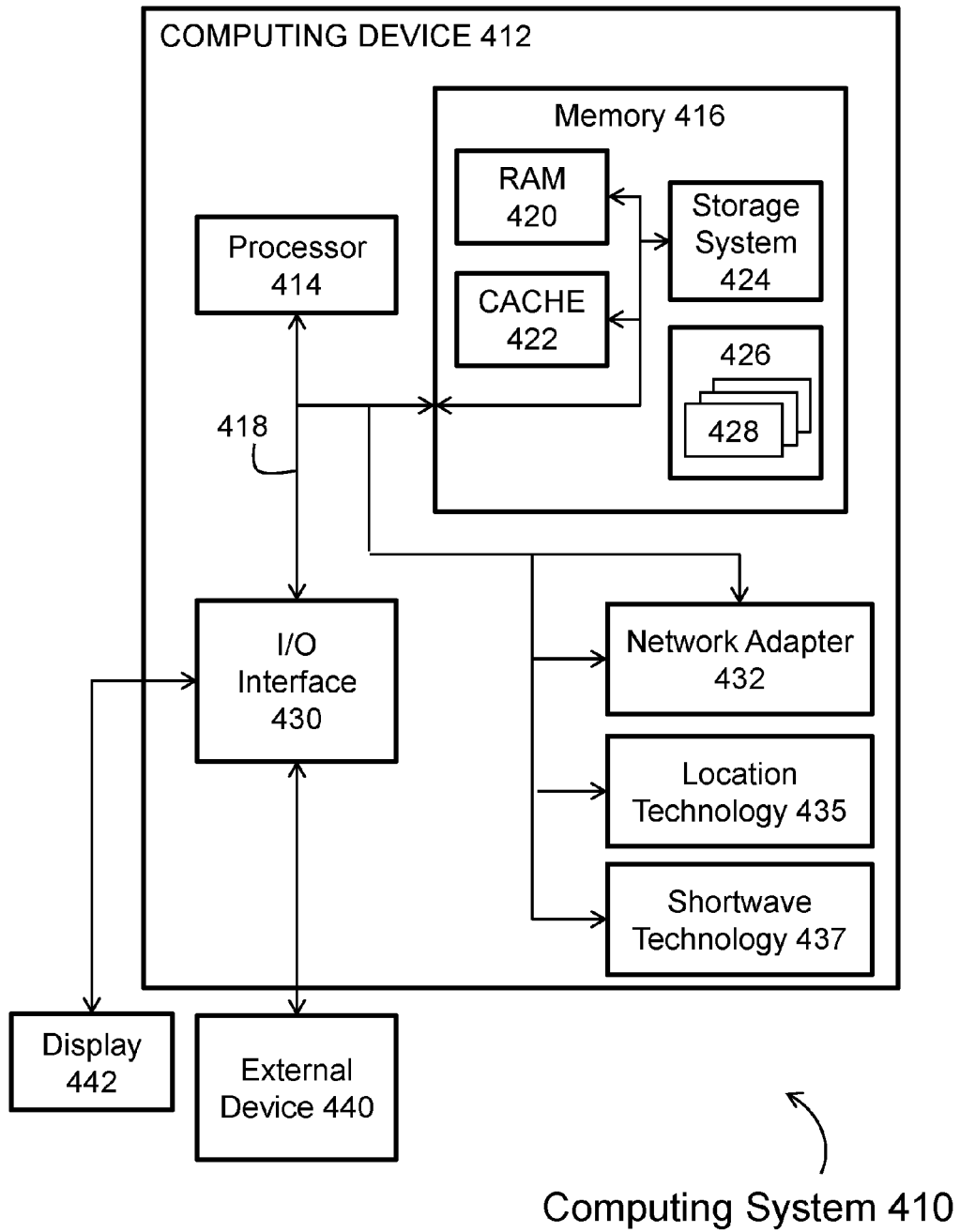
FIG. 4 illustrates a computing device schematic of a notification system according to one embodiment.

Referring now to FIG. 4, an example schematic of computing system 410 is shown. The computing system 410 (e.g., example of a notification system 100) is only one example of a suitable computing node and is not intended to suggest any limitation as to the scope of use or operability of embodiments of the invention described herein (indeed additional or alternative components and/or implementations may be used). That is, the computing system 410 and elements therein may take many different forms and include multiple and/or alternate components and facilities. Further, the computing system 410 may include and/or employ any number and combination of computing devices and networks utilizing various communication technologies, as described herein. Regardless, the computing system 410 is capable of being implemented and/or performing any of the operability set forth hereinabove.

In the computing system 410 there is a computing device 412, which is operational with numerous other general purpose or special purpose computing system environments or configurations. Systems and/or computing devices, such as the computing system 410 and/or the computing device 412, may employ any of a number of computer operating systems. Examples of computing systems, environments, and/or configurations that may be suitable for use with the computing device 412 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, computer workstations, servers, desktops, notebooks, network devices, mainframe computer systems, and distributed cloud computing environments that include any of the above systems or devices, and the like.

The computing device 412 may be described in the general context of computer system executable instructions, such as program modules, being executed by a computer system. Generally, program modules may include routines, programs, objects, components, logic, data structures, and so on that perform particular tasks or implement particular abstract data types. The computing device 412 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, the computing device 412 in the computing system 410 is in the form of a general-purpose computing device that is improved upon by the operation and functionality of the computing system 410, its methods, and/or elements thereof. The components of the computing device 412 may include, but are not limited to, one or more central processing units (herein 'processor') 414, a memory 416, and a bus (or communication channel) 418 which may take the form of a bus, wired or wireless network, or other forms, that couples various system components including to the processor 414 and the memory 416. The computing device 412 also typically includes a variety of computer system readable media. Such media may be any available media that is accessible by the computing device 412, and it includes both volatile and non-volatile media, removable and non-removable media.

The processor 414 may receive computer readable program instructions from the memory 416 and execute these instructions, thereby performing one or more processes defined by the computing system 410. The processor 414 may include any processing hardware, software, or combination of hardware and software utilized by the computing device 414 that carries out the computer readable program instructions by performing arithmetical, logical, and/or input/output operations. Examples of the processor 414 include, but are not limited to an arithmetic logic unit, which performs arithmetic and logical operations; a control unit, which extracts, decodes, and executes instructions from a memory; and an array unit, which utilizes multiple parallel computing elements.

The memory 416 may include a tangible device that retains and stores computer readable program instructions, as provided by the computing system 410, for use by the processor 414 of the computing device 412. The memory 416 can include computer system readable media in the form of volatile memory, such as random access memory 420, cache memory 422, and/or the storage system 424.

By way of example only, the storage system 424 can be provided for reading from and writing to a non-removable, non-volatile magnetic media (not shown and typically called a "hard drive", either mechanical or solid-state). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 418 by one or more data media interfaces. As will be further depicted and described below, the memory 516 may include at least one program product having a set (e.g., at least one) of program modules that are configured to carry out the operations of embodiments of the invention. The storage system 424 (and/or memory 416) may include a database, data repository or other data store and may include various kinds of mechanisms for storing, accessing, and retrieving various kinds of data, including a hierarchical database, a set of files in a file system, an application database in a proprietary format, a relational database management system (RDBMS), etc. The storage system 424 may generally be included within the computing device 412, as illustrated, employing a computer operating system such as one of those mentioned above, and is accessed via a network in any one or more of a variety of manners.

Program/utility 426, having a set (at least one) of program modules 428, may be stored in memory 416 by way of example, and not limitation, as well as an operating system, one or more application programs, other program modules, and program data. Each of the operating system, one or more application programs, other program modules, and program data or some combination thereof, may include an implementation of a networking environment. Program modules 428 generally carry out the operations and/or methodologies of embodiments of the invention as described herein.

The bus 418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

The computing device 412 may also communicate via an input/output (I/O) interface 430, a network adapter 432, location technology 435, and/or shortwave technology 437. The I/O interface 430 and/or the network adapter 432 may include a physical and/or virtual mechanism utilized by the computing device 412 to communicate between elements internal and/or external to the computing device 412. For example, the I/O interface 430 may communicate with one or more external devices 440, such as a keyboard, a pointing device, a display 442, etc.; one or more devices that enable a user to interact with the computing device 412; and/or any devices (e.g., network card, modem, etc.) that enable the computing device 412 to communicate with one or more other computing devices. Further, the computing device 412 can communicate to a lockbox 105 over one or more wireless connections such as Bluetooth, Bluetooth low energy, Infrared, NFC (Near Field Communication), etc. Further, the computing device 412 can communicate with one or more networks such as a local area network (LAN), a general wide area network (WAN), and/or a public network (e.g., the Internet) via network adapter 432. Thus, I/O interface 430 and/or the network adapter 432 may be configured to receive or send signals or data within or for the computing device 412. As depicted, the I/O interfaces 430 and the network adapter 432 communicates with the other components of the computing device 412 via the bus 418. It should be understood that although not shown, other hardware and/or software components could be used in conjunction with the computing device 412. Examples, include, but are not limited to: microcode, device drivers, redundant processing units, external disk drive arrays, RAID systems, tape drives, and data archival storage systems, etc.

While single items are illustrated for the computing system 410 (and other items) by FIG. 4, these representations are not intended to be limiting and thus, any items may represent a plurality of items. In general, computing devices may include a processor (e.g., a processor 414 of FIG. 4) and a computer readable storage medium (e.g., a memory 416 of FIG. 4), where the processor receives computer readable program instructions, e.g., from the computer readable storage medium, and executes these instructions, thereby performing one or more processes, including one or more of the processes described herein.

Computer readable program instructions may be compiled or interpreted from computer programs created using assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on a computing device, partly on the computing device, as a stand-alone software package, partly on a local computing device and partly on a remote computer device or entirely on the remote computer device. In the latter scenario, the remote computer may be connected to the local computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention. Computer readable program instructions described herein may also be downloaded to respective computing/processing devices from a computer readable storage medium or to an external computer or external storage device via a network (e.g., any combination of computing devices and connections that support communication). For example, a network may be the Internet, a local area network, a wide area network and/or a wireless network, comprise copper transmission cables, optical transmission fibers, wireless transmission, routers, firewalls, switches, gateway computers and/or edge servers, and utilize a plurality of communication technologies, such as radio technologies, cellular technologies, etc.

Computer readable storage mediums may be a tangible device that retains and stores instructions for use by an instruction execution device (e.g., a computing device as described above). A computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Thus, the notification system and/or elements thereof may be implemented as computer readable program instructions on one or more computing devices, stored on computer readable storage medium associated therewith. A computer program product may comprise such computer readable program instructions stored on computer readable storage medium for carrying and/or causing a processor to carry out the operations of the notification system. The notification system, as implemented and/or claimed, improves the functioning of a computer and/or processor itself by enabling a seamless user experience between the property, the electronic lockbox, and the user device system through direct computations of user positions and directions that are further utilized to deliver faster and more automatic real-time notifications.

The technical effects and benefits include enabling the private convenience of automatically executing notification without a showing agent needing to take action. Further, the technical effects and benefits include enabling commercial advantages of providing start- and end-of-showing notifications, utilizing these notifications to produce showing metrics, and analyzing the showing metrics to complete a sale of real property and/or protect the real property itself. In this way, due to a property owner often having to leave their property when an agent is showing it to a potential buyer, the technical effects and benefits include an improvement on the status quo for notifying a property owner that they may now return home, so that the situation of when a buyer's agent doesn't have the phone number or forgets to call the property owner is accounted for.

The technical effects and benefits also include when the notification system is utilized for a service person seeking entry to a property (e.g., homebuilder market, installer, maid service, medical personnel, etc.) in that the notification system determines time-on-site. For example, access to the electronic lockbox can define the beginning of the time-on-site and a trigger the creation of a geo-fence. Then when service person leaves the property, a time at which a breach of the geo-fence occurs is utilized to calculate a total time-on-site. The time-on-site can then feed into service systems coupled to the notification system for record keeping, billing information, etc., which is specifically helpful in cases like after an appliance delivery damage to the property was found.

In addition, the technical effects and benefits of the notification system overcome end of showing notifications triggered by a push button on a key box, which require a dialer in the property that links from the key box and provides the network connection. That is, without that dialer, their system is non-networked. In this way, the notification avoids the need for a dialer as the user device itself can run a notification application to generate the geo-fence and trigger automatic real-time notifications.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the operations/acts specified in the flowchart and/or block diagram block or blocks. These computer readable program instructions may also be stored in a computer readable storage medium that can direct a computer, a programmable data processing apparatus, and/or other devices to operate in a particular manner, such that the computer readable storage medium having instructions stored therein comprises an article of manufacture including instructions which implement aspects of the operation/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the operations/acts specified in the flowchart and/or block diagram block or blocks.

The flowchart and block diagrams in the FIGS. illustrate the architecture, operability, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical operation(s). In some alternative implementations, the operations noted in the block may occur out of the order noted in the FIGS. For example, two blocks shown in succession may, in fact, be executed substantially concurrently, or the blocks may sometimes be executed in the reverse order, depending upon the operability involved. It will also be noted that each block of the block diagrams and/or flowchart illustration, and combinations of blocks in the block diagrams and/or flowchart illustration, can be implemented by special purpose hardware-based systems that perform the specified operations or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method by a notification system for providing an automatic real-time notification to an owner of a property, comprising:
    determining a location with respect to an electronic lockbox associated with the property;
    generating a geo-fence environment with respect to the property based on the location,
    wherein the geo-fence environment is a virtual radial geo-fence with the electronic lockbox as a center;
    monitoring movements of a user device with respect to the geo-fence environment to determine whether a breach of the geo-fence environment has occurred,
    wherein the determination that the breach of the geo-fence environment has occurred is a determination that a user of the user device has concluded a showing and left the property; and
    outputting the automatic real-time notification to the property owner in response to a determination that the breach of the geo-fence environment has occurred.

2. The method of claim 1, wherein the generating of the geo-fence environment based on the location further comprises:
    generating the geo-fence environment based on data parameters.

3. The method of claim 2, wherein the data parameters are read from at least one of the electronic lockbox, a database coupled to the notification system, and a web-based service in communication with the notification system.

4. The method of claim 1, wherein the automatic real-time notification is a message to the owner that a user of the user device has concluded a showing and left the property.

5. The method of claim 4, wherein the message includes a duration of the showing.

6. The method of claim 4, wherein the message includes a real time status of the showing.

7. The method of claim 1, wherein the electronic lockbox is a real estate lockbox.

8. A notification system for providing an automatic real-time notification to an owner of a property, comprising a processor and a memory, the processor configured to perform:
    determining a location with respect to an electronic lockbox associated with the property;
    generating a geo-fence environment with respect to the property based on the location,
    wherein the geo-fence environment is a virtual radial geo-fence with the electronic lockbox as a center;
    monitoring movements of a user device with respect to the geo-fence environment to determine whether a breach of the geo-fence environment has occurred,
    wherein the determination that the breach of the geo-fence environment has occurred is a determination that a user of the user device has concluded a showing and left the property; and
    outputting the automatic real-time notification to the property owner in response to a determination that the breach of the geo-fence environment has occurred.

9. The notification system of claim 8, wherein the generating of the geo-fence environment based on the location further comprises:
    generating the geo-fence environment based on data parameters.

10. The notification system of claim 9, wherein the data parameters are read from at least one of the electronic lockbox, a database coupled to the notification system, and a web-based service in communication with the notification system.

11. The notification system of claim 8, wherein the automatic real-time notification is a message to the owner that a user of the user device has concluded a showing and left the property.

12. The notification system of claim 9, wherein the message includes a duration of the showing.

13. The notification system of claim 9, wherein the message includes a real time status of the showing.

14. The notification system of claim 8, wherein the electronic lockbox is a real estate lockbox.

* * * * *